US006065206A

United States Patent [19]

[11] Patent Number: 6,065,206
[45] Date of Patent: May 23, 2000

West

[54] SURGE PROTECTION SYSTEM FOR BUSWAY DEVICES AND METHOD OF MAKING SAME

[75] Inventor: Rodney Joe West, Liberty, Ind.

[73] Assignee: Square D Company, Palatine, Ill.

[21] Appl. No.: 09/215,597

[22] Filed: Dec. 17, 1998

Related U.S. Application Data

[62] Division of application No. 08/711,614, Sep. 10, 1996.

[51] Int. Cl.[7] .................................................. H01R 43/00
[52] U.S. Cl. ................................ 29/825; 248/49; 403/297
[58] Field of Search .............................. 29/825, 828, 832, 29/840

[56] References Cited

U.S. PATENT DOCUMENTS 4,705,334 11/1987 Slicer et al. .
5,203,135 4/1993 Bastian .
5,580,014 12/1996 Rinderer .

*Primary Examiner*—Carl J. Arbes
*Attorney, Agent, or Firm*—David R. Stacey; Larry I. Golden; Larry T. Shrout

[57] ABSTRACT

A method of making a surge protection system for use on sectionalized electrical busway distribution system housings. The surge protection system includes a number of surge clamps; each cut to a particular length from an extruded rawstock. The extruded rawstock is of a length easily manipulated by one person. The extruded rawstock defines at least one generally flat longitudinal surface and a passage extending along its longitudinal axis. When each surge clamp is installed the generally flat longitudinal surface engages a generally flat surface of a top or bottom of the busway housing. Each end of the surge clamp engages one of two generally parallel sides of the busway housing. Apertures are defined in the sides at the point of engagement with the surge clamp ends. Fastening devices such a screw pass through the apertures and into the passage defined by the surge clamps thus providing a means for attaching the surge clamp to the busway housing.

7 Claims, 5 Drawing Sheets

SURGE PROTECTION SYSTEM FOR BUSWAY DEVICES AND METHOD OF MAKING SAME

This application is a division of co-pending U.S. patent application Ser. No. 08/711,614, filed on Sep. 10, 1996.

FIELD OF THE INVENTION

This invention relates to busway electrical distribution systems and more specifically to a method of making a surge protection system for a busway housing.

BACKGROUND OF THE INVENTION

Busway electrical distribution systems are well known in the art of electrical distribution. Busway electrical distribution systems are comprised of a number of factory assembled sections, each including a number of individually insulated generally flat electrical conductors or busbars stacked one upon another and enclosed within a housing which provides protection and support for the bus bars. Each housing includes a duct top and a duct bottom, which cover the flat surfaces of the outermost bus bars, and two duct sides, which cover the edges of the bus bars. The duct tops and bottoms can be made of electrically conductive material such as aluminum or copper for carrying the system ground current. The duct sides are generally made of steel formed to provide strength to the housing. The housing is generally held together by screws and nuts, rivets, stitching or other similar methods. The width of the enclosure is determined by the width of the busbars and the number of busbar stacks enclosed within the housing. During a short circuit condition, magnetic forces around the busbars tend to push the busbars away from each other, thereby causing the tops and bottoms to bulge. High short circuit currents can cause the housing to be pulled apart. To prevent or limit short circuit damage, structural members called surge clamps are placed across the duct tops and bottoms at each end of the busway section and at predetermined intervals between the ends. The surge clamps are generally U-shaped in cross-section with flanges closing the ends and are formed from 12 Ga. or 14 Ga. steel. The surge clamps are fastened to the duct sides by means such as screws that pass through the duct side and into the surge clamp end flanges. The length of the surge clamp is determined by the width of the busway enclosure on which it is to be used. Since there are a number of enclosure widths there must also be a like number of surge clamp lengths. Therefore, large quantities of each surge clamp length must be made and stored in inventory to maintain an adequate supply for production line usage. Manufacturing of surge clamps requires shearing blanks for each required length, forming each blank into a surge clamp, painting the formed surge clamp with an acceptable corrosion resistant coating and placing the finished surge clamps, sorted by length (or part number) into inventory. In some cases, the end and side flanges are welded together to give additional strength to the surge clamp. This is a time consuming process, and, since at least four surge clamps are required for each busway section, large quantities of each surge clamp length are manufactured at one time and placed in inventory to prevent a busway production line stoppage due to shortages of a particular surge clamp. Further, having to maintain a large inventory of parts is expensive since it requires manufacturing time to make the surge clamps and storage space to store the surge clamps until needed. It would therefore be desirable to have surge clamps, which can be manufactured in minutes, as needed, from a common rawstock, thus eliminating the need for an extensive manufacturing process and a large inventory of many different parts.

SUMMARY OF THE INVENTION

The surge clamps used in the surge protection system of the present invention can be manufactured as required in a matter of minutes on or near the busway assembly line, thereby eliminating the blank shearing, forming, painting and storing of finished parts. An extruded surge clamp rawstock is provided in lengths easily handled by one person. Each surge clamp is made by cutting the surge clamp rawstock off at the required surge clamp length, using a shearing die or an abrasive cutoff saw. Thus, the only inventory requirement is for the extruded rawstock that is used for all surge clamp lengths. The surge clamp rawstock is preferably a corrosion resistant material such as aluminum and therefore requires no additional corrosion protection.

Other features and advantages of the invention will become apparent to those skilled in the art upon review of the following detailed description, claims and drawings.

Figure 1:
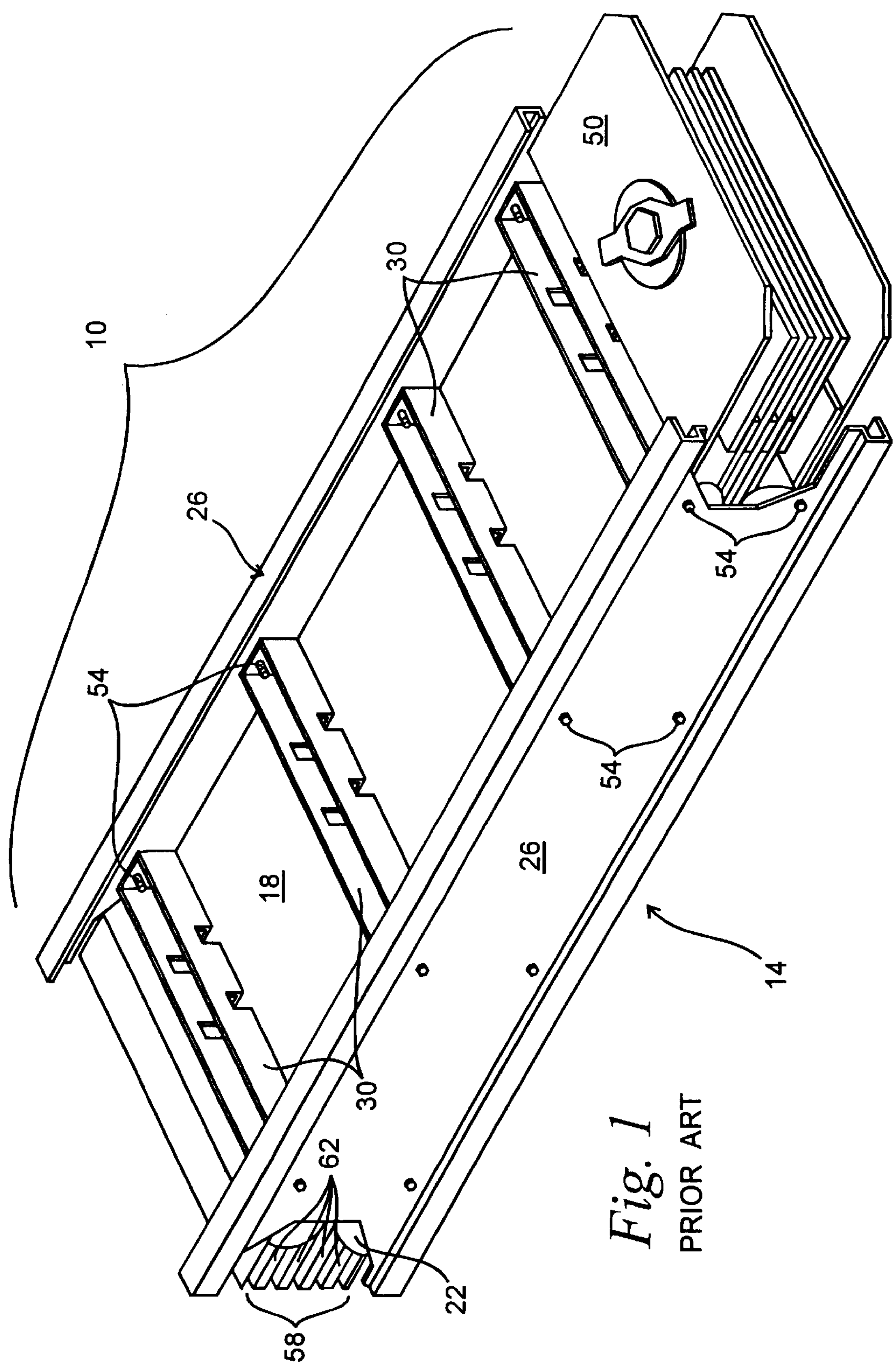
FIG. 1 is an isometric view of a surge clamp of the prior art installed on a busway section.

Before one embodiment of the invention is explained in detail, it is to be understood that the invention is not limited in its application to the details of construction in the description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a typical busway section of a sectionalized busway electrical distribution system known in the art and generally indicated by reference numeral 10. The busway section 10 consists of a housing generally indicated by reference numeral 14. The housing 14 includes a duct top 18, a duct bottom 22, two generally parallel duct sides 26 extending along the longitudinal dimension of the busway section 10 and a number of surge clamps 30 which are placed across the duct top 18 and duct bottom 22 at each end of the busway section 10 and at predetermined intervals between the ends.

Figure 2:
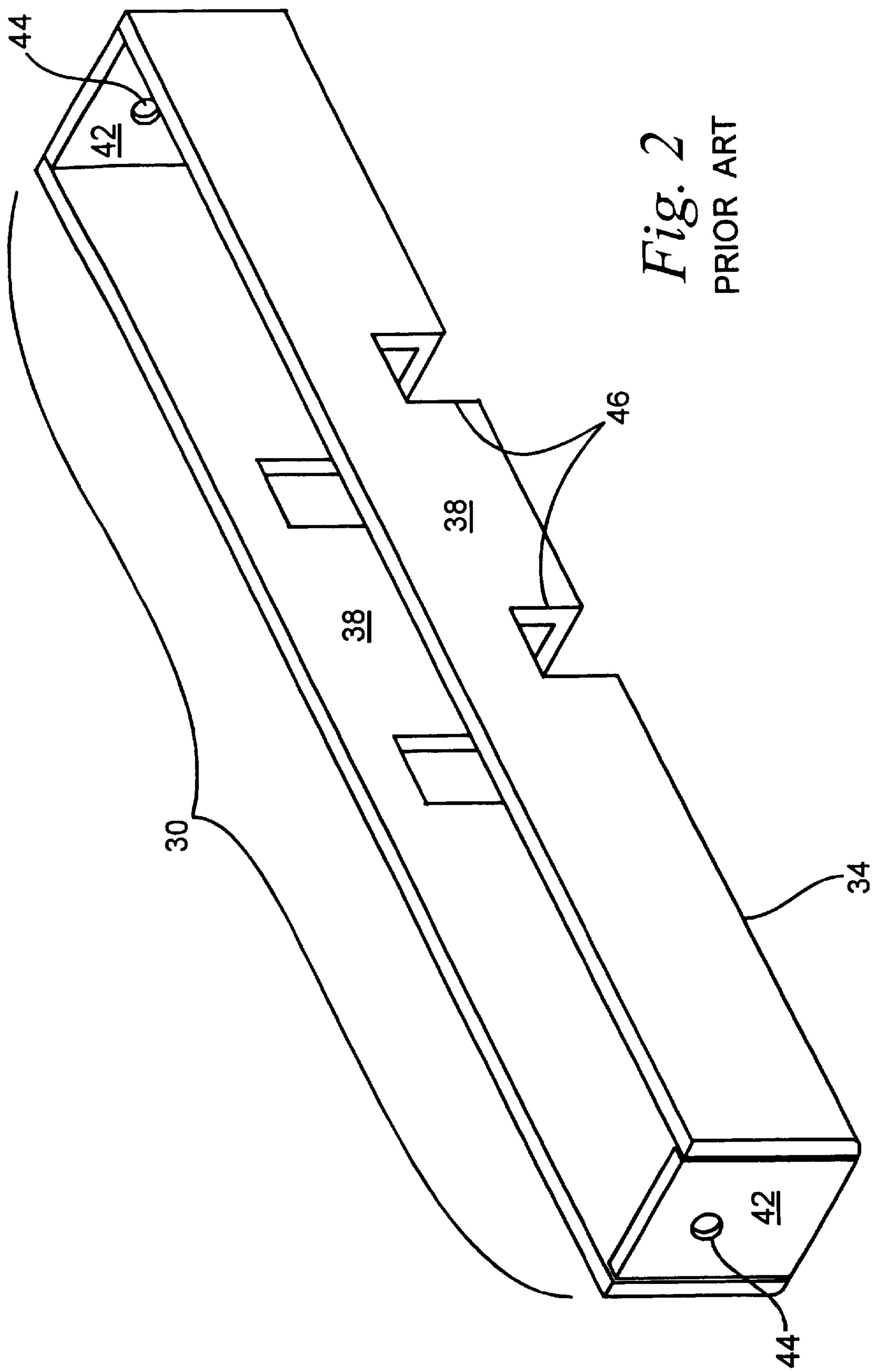
FIG. 2 is an isometric view of a surge clamp of the prior art.
Figure 4:
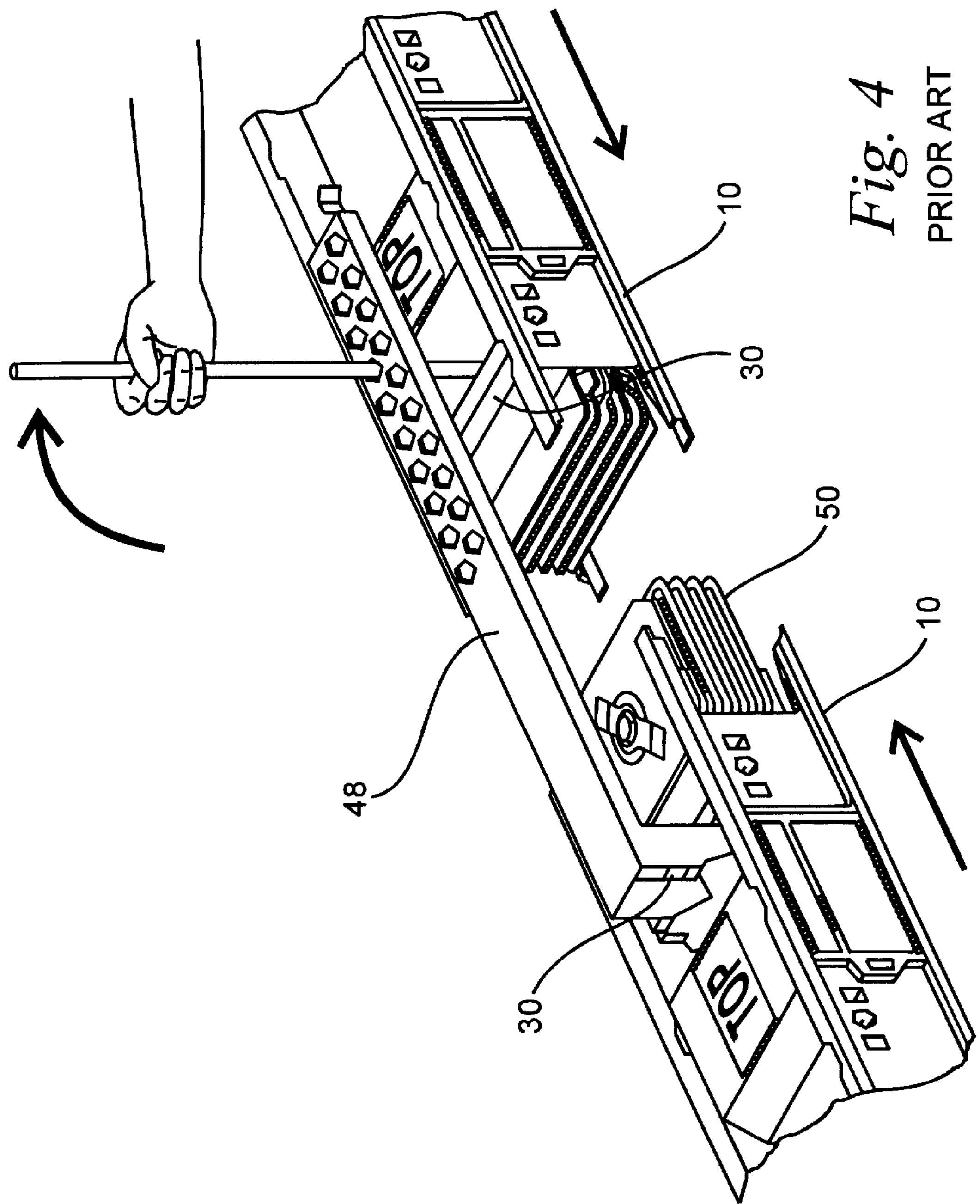
FIG. 4 illustrates the use of a busway assembly tool in assembling adjacent busway sections during the installation of a sectionalized busway electrical distribution system.
Figure 5:
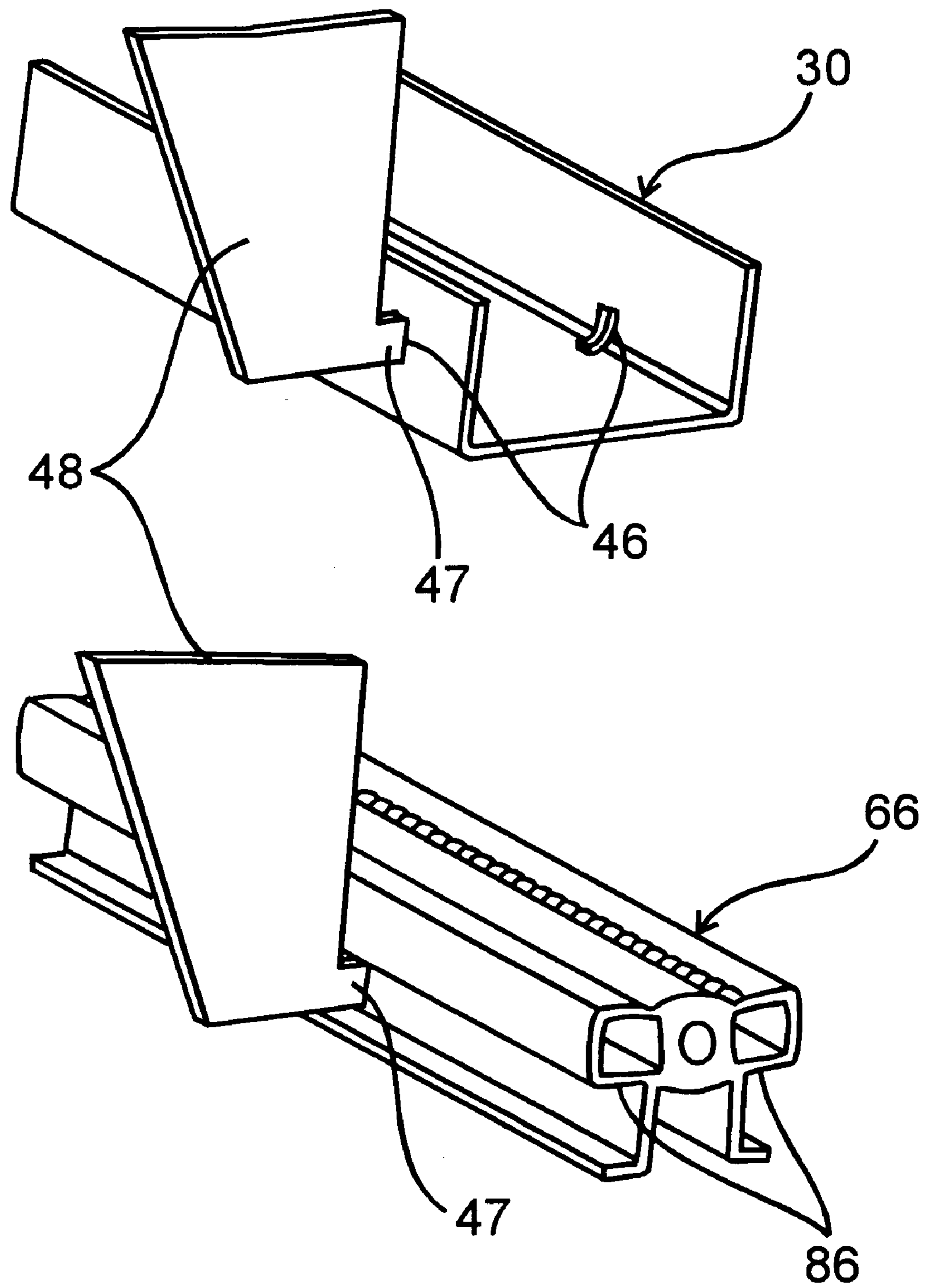
FIG. 5 illustrates in detail the engagement of the busway assembly tool with the prior art surge clamps and with the extruded surge clamps of the present invention.

Referring now to FIG. 2, the surge clamps 30 are formed from 12 Ga. or 14 Ga. sheet or strip steel. The surge clamp 30 is a channel like structure having a generally flat bottom 34 and two generally parallel sides 38 extending perpendicularly from the flat bottom 34 along its longitudinal dimension. Two end flanges 42 extend generally perpendicularly from the flat bottom 34 and intermediate the two parallel sides 38. The end flanges 42 close off the channel and in some cases are welded to the two parallel sides 38 for additional strength. Each end flange 42 has a hole 44, which provides a means of attaching the surge clamp 30 to the duct sides 26. The surge clamp 30 can also include a plurality of slots 46 located in the parallel sides 38 at their intersection with the flat bottom 34 for receiving one or more hooks 47 of a busway assembly tool 48, as shown in FIG. 5. The busway assembly tool 48 spans the area between two adjacent busway section 10 ends such that the assembly tool can be used as a lever to pull the two busway section 10 ends together into a joint connector 50 (see FIG. 4).

Referring again to FIG. 1, each surge clamp 30 is positioned intermediate and generally perpendicular to the parallel duct sides 26 and rests firmly against either the duct top 18 or duct bottom 22. The surge clamps 30 are attached to the duct sides 26 by thread cutting screws 54 or similar attachment means passing through the duct sides 26 and into the holes 44 of the end flanges 42.

Enclosed within the housing 14 is a conductor stack 58. The conductor stack 58 is composed of a plurality of individually insulated generally flat electrical conductors 62 or busbars. These conductors 62 are arranged one upon another to form the conductor stack 58. Generally, one conductor 62 is provided for each electrical phase of the distribution system. However, in high current systems the housing 14 may enclose multiple conductor stacks 58 placed side by side within the housing 14. The total system current is divided substantially equally between the conductor stacks 58. The width of the housing 14 is determined by the width of duct top and bottom, 18 and 22, respectively, which in turn is determined by the width of the conductors 62 and the number of conductor stacks 58 within the housing 14. Therefore, the length of each surge clamp 30 will be determined by the particular width of the housing 14 on which it is to be installed.

Figure 3:
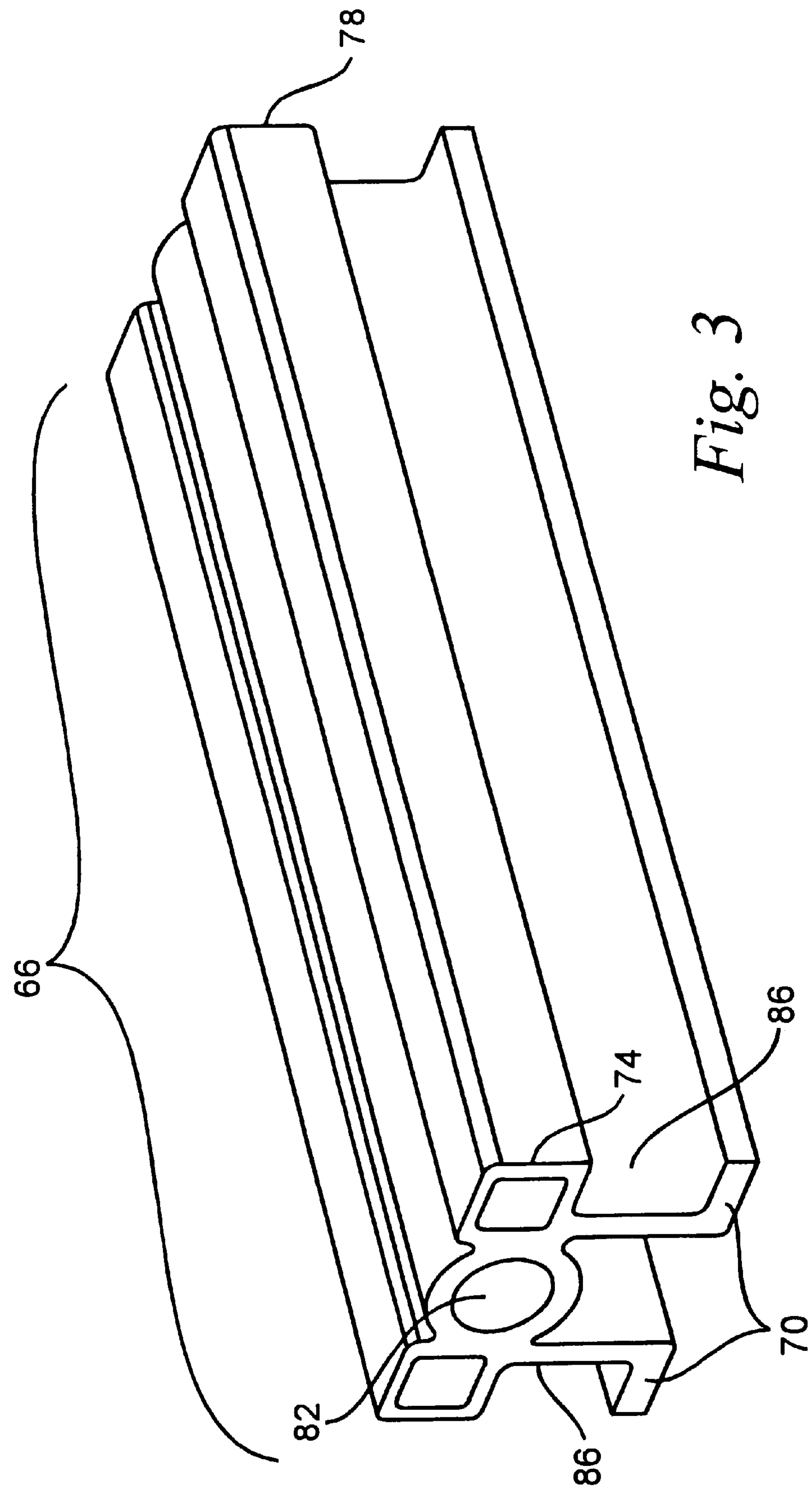
FIG. 3 is an isometric view of a surge clamp in accordance with the present invention.

Referring now to FIG. 3, an extruded surge clamp in accordance with the present invention is illustrated and generally indicated by reference numeral 66. The surge clamp 66 is made from an extruded rawstock provided in lengths suitable for easy handling by one person. The surge clamp 66 requires no blank shearing, forming or painting. The surge clamp rawstock is cut to the required length for use on a particular busway housing 14 by a shearing die or an abrasive cutoff saw. The surge clamp 66 has at least one generally flat surface 70 extending between a first end 74 and a second end 78 for engaging the generally flat surfaces of duct top and duct bottom, 18 and 22, respectively. The surge clamp 66 also defines a passage 82 extending generally along its longitudinal axis between the first and second ends, 74 and 78, respectively. Generally tubular portions 90 are defined along each side of the passage 82 and extend between the first and second ends, 74 and 78, respectively, of the surge clamp 66. These tubular portions 90 provide additional structural strength to the surge clamp 66 along both the horizontal and vertical cross-sectional axes. The extruded surge clamps 66 are assembled to the busway housing 14 in the same manner as the formed surge clamp 30 of FIG. 1. The flat surfaces 70 are placed firmly against the generally flat surfaces of the busway housing duct top and duct bottom, 18 and 22, respectively, and fastening devices such as the screws 54 of FIG. 1 pass through the duct sides 26 and are received in the passage 82 at each of the first and second ends, 74 and 78, respectively. The extruded surge clamp 66 is also provided with an undercut 86 extending along each side between the first and second ends, 74 and 78, respectively. The undercuts 86 are defined by the tubular portions 90 and the generally flat surface 70. The undercut 86 receives the hooks 47 of the busway assembly tool 48 as did the slots 46 of the formed surge clamp 30. The additional structural strength provided by the tubular sections 90 along the horizontal cross-sectional axis is required when the busway assembly tool 48 is leveraged against the surge clamps 66 of two adjacent busway sections 10 to pull the two adjacent busway sections 10 together (see FIG. 4).

I claim:

1. A method of making a surge protection system and assembling the surge protection system onto a busway housing having a particular width, the method including the steps of:

extruding a metallic form into a length easily manipulated by one person, said extruded metallic form defining at least one generally flat longitudinally extending surface and a centrally located passage extending generally along its longitudinal axis;

cutting said extruded metallic form into at least one surge clamp defined by a first and a second end, said at least one surge clamp being of a particular length between said first and second ends, said particular length being determined by the particular width of the busway housing on which said surge clamp is to be used;

placing said at least one surge clamp on the busway housing such that said at least one surge clamp extends generally between two parallel sides of the busway housing, each of said first and second ends engaging one of the parallel sides such that said at least one flat surface continuously engages a flat surface of a top or a bottom of the busway housing; and securing said at least one surge clamp to the two parallel sides of the busway housing by inserting a fastening means through an aperture defined in each of the two sides adjacent said first and second ends of said at least one surge clamp and into said centrally located passage.

2. A method of making a surge protection system for an electrical busway housing, the method including the steps of:

extruding a metallic form into a length easily manipulated by one person, said extruded metallic form defining at least one generally flat longitudinally extending surface and a centrally located passage extending generally along its longitudinal axis;

cutting one or more of said lengths of said extruded metallic form into a particular number of surge clamps, each said surge clamp being defined by two ends and having a particular length between said two ends, said particular length determined by a particular width of the busway housing on which said surge protection system is to be installed;

placing said particular number of surge clamps on the busway housing such that each of said particular number of surge clamps extends generally between two parallel sides of the busway housing and such that said at least one flat surface of each of said surge clamps continuously engages a generally flat top or a generally flat bottom of the busway housing, each of said two ends of each of said surge clamps engaging one of the two sides of the busway housing; and securing each of said particular number of surge clamps to the busway housing by inserting a fastening means through apertures defined in each of the two sides of the busway housing immediately adjacent each said end of each of said surge clamps and securing said fastening means within said centrally located passage defined by each of said surge clamps.

3. The method of making a surge protection system of claim 2 wherein said particular number of surge clamps is determined by the longitudinal length of the busway housing.

4. A method of making a surge protection system and assembling the surge protection system onto a busway housing having a particular width, the method including the steps of:

extruding a metallic form into a length easily manipulated by one person, said extruded metallic form defining at least one generally flat longitudinally extending surface and a centrally located passage extending generally along its longitudinal axis;

cutting said extruded metallic form into at least one pair of surge clamps, each defined by a first and a second end, and being of a particular length between said first and second ends, said particular length being determined by the particular width of the busway housing on which said at least one pair surge clamps is to be used;

placing said at least one pair of surge clamps on the busway housing such that each of said at least one pair of surge clamps extends generally between two parallel sides of the busway housing and each of said first and second ends engage one of the two parallel sides, said at least one flat surface of each of said at least one pair of surge clamps continuously engaging a generally flat surface of one of a top or a bottom of the busway housing; and securing said at least one pair of surge clamps to the two parallel sides of the busway housing by inserting a fastening means through apertures defined in each of the two parallel sides adjacent said first and second ends of each of said at least one pair of surge clamps and into said centrally located passage.

5. A method of making the surge protection system of claim 4, wherein additional pairs of surge clamps are placed at intervals along the longitudinal length of the busway housing and secured between the generally parallel sides of the busway housing for providing additional surge protection to the busway housing.

6. A method of making a surge protection system for limiting damage to a housing and a plurality of enclosed busbars of a section of a sectionalized electrical busway distribution system, the method including the steps of:

extruding a metallic form into a length easily manipulated by one person, said extruded metallic form defining at least one generally flat longitudinally extending surface and a centrally located passage extending generally along its longitudinal axis;

cutting said extruded metallic form into at least two pairs of surge clamps, each surge clamp of said at least two of pairs of surge clamps being defined by two ends and being a particular length between said two ends, said particular length determined by a particular width of the busway housing on which said surge protection system is to be installed;

placing one pair of said at least two pairs of surge clamps at each end of an assembled busway electrical distribution section such that each surge clamp of said at least two pairs of surge clamps extends generally between two parallel sides of the busway housing and one of said two ends of each surge clamp of said at least two pairs of surge clamps engages one of the two sides of the busway housing, said at least one flat surface of one surge clamp of said at least two pairs of surge clamps continuously engages a generally flat top surface of the busway housing and said at least one flat surface of the other surge clamp of said at least two pair of surge clamps continuously engages a generally flat bottom surface of the busway housing; and securing each surge clamp of said at least two pairs of surge clamps to the busway housing by inserting a fastening means through apertures defined in each of the two sides of the busway housing immediately adjacent each said end of each of said surge clamps and securing said fastening means within said centrally located passage defined by each surge clamp of said at least two pairs of surge clamps thereby clamping an intermediate portion of the assembled busway electrical distribution section between each pair of said at least two pairs of surge clamps.

7. A method of making the surge protection system of claim 6, wherein additional pairs of surge clamps are placed at intervals along the longitudinal length of the busway housing and secured between the generally parallel sides of the busway housing for providing additional surge protection to the busway electrical distribution section between its ends.

* * * * *